United States Patent [19]
Malone

[11] 3,942,890
[45] Mar. 9, 1976

[54] SECURE ACTIVE SENSOR

[75] Inventor: Warren L. Malone, Falls Church, Va.

[73] Assignee: The United States of America as represented by the Secretary of the Navy, Washington, D.C.

[22] Filed: Mar. 21, 1974

[21] Appl. No.: 453,453

[52] U.S. Cl. .......................... 356/4; 356/5; 356/112
[51] Int. Cl.² .............................................. G01C 3/08
[58] Field of Search ............... 356/4, 5, 112, 163, 28

[56] References Cited
UNITED STATES PATENTS

| | | | |
|---|---|---|---|
| 3,019,690 | 2/1962 | Hildebrand et al. | 356/5 |
| 3,617,930 | 11/1971 | Snitzer et al. | 331/94.5 |
| 3,676,003 | 7/1972 | Naiman et al. | 356/5 |
| 3,743,418 | 7/1973 | Heflinger | 356/5 |
| 3,802,775 | 4/1974 | Hughes | 356/4 |
| 3,825,340 | 7/1974 | Debart | 356/5 |

Primary Examiner—Richard A. Farley
Assistant Examiner—S. C. Buczinski
Attorney, Agent, or Firm—R. S. Sciascia; Arthur L. Branning; George A. Montanye

[57] ABSTRACT

An improved apparatus and technique for providing frequency selective sensing and tracking. An optical radar transmitter is constructed using a dye laser controlled by a Faraday cell having two end polarizers. The Faraday cell extends to intercept the return beam from the transmitting laser. Using a magnetic field to control the Faraday cell, the frequency of transmission can be selectively varied while the receiver-detector is automatically ganged to the transmitted frequency. The particular frequency selectivity provides significant isolation of the sensing beam from unwanted and interfering radiation allowing highly selective optical beam tracking.

3 Claims, 1 Drawing Figure

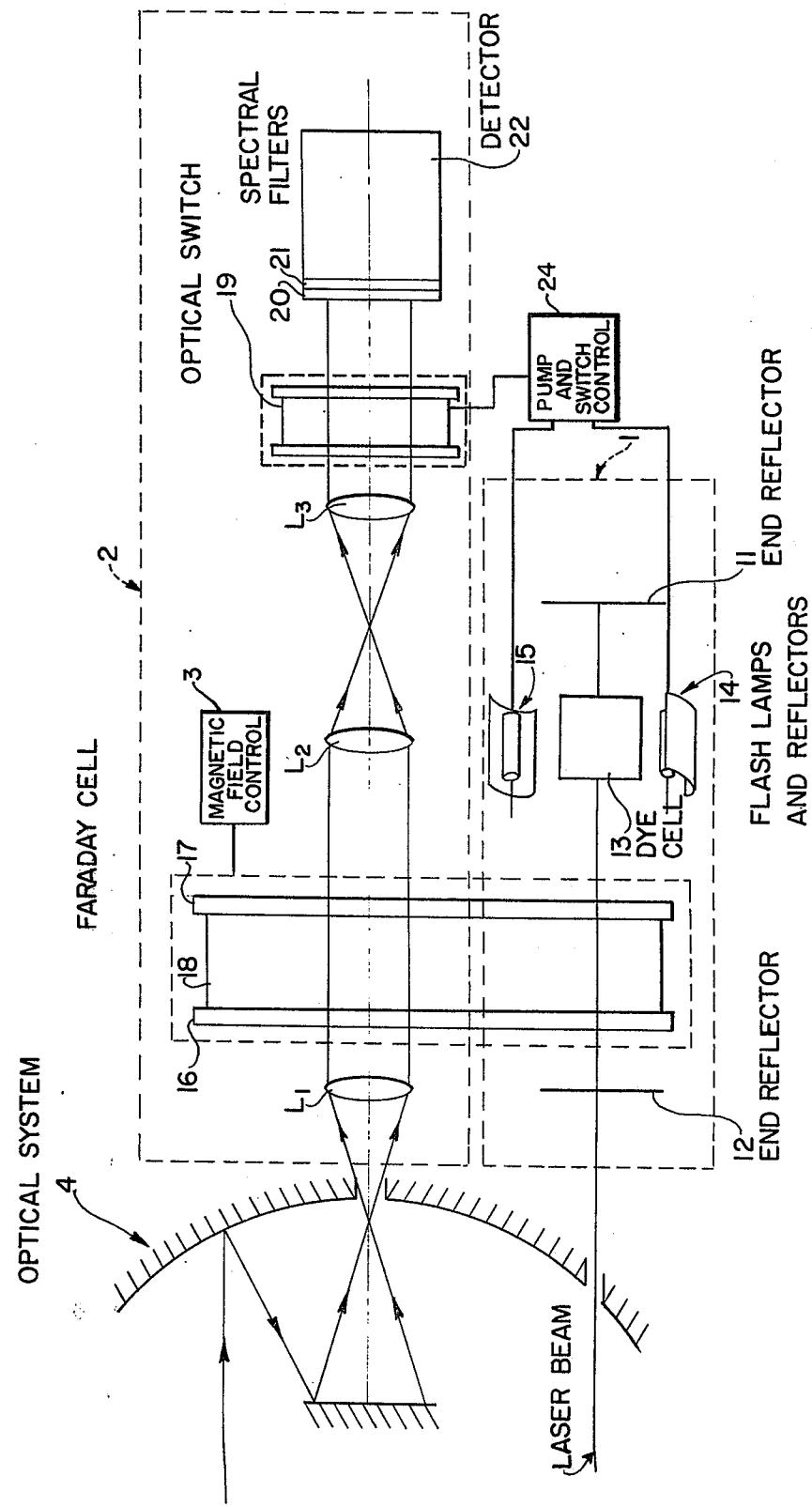

SECURE ACTIVE SENSOR

BACKGROUND OF THE INVENTION

The present invention relates to improvements in optical sensing techniques and systems, and more particularly to improvements in techniques for providing frequency selectivity and tracking in optical radar systems.

Conventional optical radar systems generally utilize a source of optical energy radiating at a known frequency and directed towards a given target. The reflected radiation is then sensed by a receiver-detector system which uses the information in the reflected beam to perform such functions as ranging and tracking of a target. The success of the optical sensing system depends on the ability of the receiver to be tuned to receive the reflected beam usually generated at a fixed frequency.

Known methods and apparatus have been deficient due to the problems encountered in precisely controlling the generated frequency and in providing frequency isolation by filtering in the receiving system. Even where frequency generation and reception have been precisely controlled, the ability to provide systems adjustable over a range of frequencies such that tracking of the transmitted beam occurs, has been very limited or unknown.

The particular significance of such deficiencies might best be appreciated where the optical systems are utilized in the presence of noise or interfering radiation. Since the ability of the system to be used as an optical radar depends on the isolation of a given signal frequency by the receiver circuits, the presence of noise would interfere significantly where precise filtering is not available. In addition, where only a single frequency is used, the system becomes highly vulnerable to interfering or jamming radiation.

Accordingly, the present invention has been developed to overcome the specific shortcomings of the above known and similar techniques and to provide a more secure optical sensing system having highly selective frequency generation and signal tracking.

SUMMARY OF THE INVENTION

It is therefore an object of this invention to provide an optical radar system that has all the advantages of similarly employed techniques and none of the disadvantages.

Another object of the invention is to provide an optical transmitting system for generating frequencies with high selectivity.

A further object of the invention is to provide an optical transmitting and receiving system having the transmitter and receiver ganged together to track a given frequency.

Still another object of the invention is to provide improved optical control for isolating the received signal from interfering radiation.

A still further object of the invention is to provide a technique for generating and receiving random frequencies in an optical transmitting system.

The above objects are accomplished by constructing an optical transmitter from a dye laser controlled by a Faraday cell positioned in the laser cavity. The Faraday cell is comprised of a Faraday medium positioned between two polarizers which together act to limit the frequency of excitation of the laser while providing a randomly selectable frequency output from the laser transmitter. The reflected energy is collected by an optical receiving system and directed to pass through a portion of the same Faraday cell used to control the laser output. The received energy is then passed through an optical switch and spectral filters prior to impinging upon the radiation detector in the receiver. By controlling a magnetic field associated with the Faraday cell, the frequency transmitted and received can be controlled together through the ganged system reducing the susceptibility of the system to unwanted and interfering radiation.

Other objects, advantages, and novel features of the invention will become apparent from the following detailed description of the invention when considered in conjunction with the accompanying drawings wherein:

BRIEF DESCRIPTION OF THE DRAWINGS

The drawing is a schematic representation illustrating the particular elements and relationship of the preferred embodiment of the present invention.

DESCRIPTION OF THE PREFERRED EMBODIMENT

Referring now to the drawing, there is shown by illustration a frequency selective transceiver or optical radar constructed in accordance with the teaching of this invention. As shown the device generally includes a transmitting portion 1 and a receiving portion 2 with both portions coupled through an optical system which allows both transmission of the beam along a boresight axis to a target and reception of the reflected beam for transmission to the receiving portion. While the transmitting and receiving portions have been shown separately by dotted boxes 1 and 2, the same is for purpose of illustration only and is not meant to limit the configuration of the device which could be constructed as an integral unit or in any manner consistent with the operation of the invention.

Turning first to the transmitting portion 1, the same is generally constructed as a well known laser system having lasing medium 13 positioned between two end reflectors 11 and 12 defining the laser cavity, and having an optical pump source (14 and 15) to stimulate or pulse the lasing medium to emission. The end reflector 11 is generally totally reflective to the laser radiation while the end reflector 12 is partially transmissive and partially reflective so as to enable laser emission while coupling the laser beam out of the laser cavity. The lasing medium 13 of the present example is formed as a dye cell to form what is commonly known as a dye laser. In the present invention the dye cell is used because of its characteristic of having a broad spectral emission band as opposed to a limited or single frequency and is important to the operation of the invention as will be later explained. The optical pump source is shown in the drawing as flash lamps and reflectors 14 and 15 but could be another laser or any other pump source capable of causing laser emission.

Added to the laser cavity is a Faraday cell, a well known device for anlyzing optical radiation. The Faraday cell is basically comprised of a Faraday medium 18 positioned between two end polarizers 16 and 17. The two polarizers in the cell are arranged such that the polarizations are at 90° with respect to one another. The medium mounted between the polarizers is a partially absorbing medium typically an atomic gas with selective absorption. Controlling the cell is any well known device 3 for generating a selectively variable magnetic field surrounding the cell. The Faraday cell under the control of the magnetic field acts to form a tuned laser in a known manner and limits the frequency output of the transmitting portion to provide the improved frequency selectivity.

The laser is operated as by conventional techniques to produce an optical radar beam which is directed along the boresight of an optical system 4 towards a specified target. The radiation reflected by the target is collected by the optical system which can be a conventional Cassegrainian system or any other well known system capable of receiving the reflected radiation according to the invention. The reflected radiation is then received by the receiving portion 2 of the optical radar or transceiver.

The receiving portion 2 generally contains a first relay and collimating lens $L_1$ followed by a second relay lens $L_2$ and another relay and collimating lens $L_3$. Positioned between the lenses $L_1$ and $L_2$ is a portion of the same Faraday cell extending into the path of the returning reflected beam. Since the Faraday cell is acting as a frequency selective filter under the control of the magnetic field, it will pass the same frequency on return as was generated by the laser. The generator and receiver are therefore automatically ganged so that the receiver follows the frequency of the generator. Positioned behind the lens $L_3$ along the path of the return beam is an optical switch 19 followed by spectral filters 20 and 21 and detector 22. The optical switch 19 can be another Faraday cell or any other optical retardation device such as a Pockels or Kerr cell capable of blanking the detector from radiation during a time when viewing of the reflected beam is not desired. The spectral filters are designed as broad band frequency selectors to prohibit radiation from reaching the detector except over a given range. This is in contrast with the narrow band frequency selectivity of the Faraday cell. The detector 22, comprised of any conventional optical radar detector, is therefore isolated by the frequency selectivity of the Faraday cell common to the laser and operated in conjunction with the optical switch 19 and spectral filters 20 and 21.

In operation of the system shown in the drawing, the optical switch 19 is usually controlled in conjunction with the optical pump source by conventional controls 24 in order to blank the detector from radiation during lasing. This is particularly important where the transmitting and receiving portions are mounted adjacent each other or as an integral unit in order to protect the detector from leakage radiation from the lasing system. In addition, as was mentioned above, the optical switch prevents any other radiation from reaching the detector, except during the viewing time, to prevent unwanted or interfering radiation from causing false indications.

Operation of the pump source to pulse the lasing medium initiates the operation of the transmitting portion 1. In the operation of portion 1 a plane polarized wave will enter the Faraday cell through one of the polarizers and the plane of polarization of the electric vector will be rotated through an angle which is a function of the magnetic field strength B, the Faraday medium and the length of the Faraday cell. Generally speaking, the angle of rotation $\theta$ for a fixed cell length is proportional to the magnetic field B according to the formula $\theta = K_\lambda B$ where the $K_\lambda$ is a constant which varies as a function of wavelength and the material forming the Faraday medium. In particular, $K_\lambda$ will increase sharply in the vicinity of an absorption peak in the Faraday medium.

As can be understood from the above discussion, since the two polarizers are rotated by 90°, maximum transmission of radiation will occur for those wavelengths that cause $\theta$ to be an odd multiple of 90°. That is, only those wavelengths that are rotated by an odd multiple of 90° by the medium will be transmitted. In addition, by varying the magnetic field or using a different Faraday medium, the spectral region of peak transmission can be easily altered. As a practical matter, certain wavelengths that are not transmitted on the first pass will be reflected one or more times before being transmitted on a later pass. However, since the Faraday medium is absorptive, the multiple pass transmission will be substantially attenuated relative to those wavelengths passed on the first pass (e.g. those wavelengths where $K_\lambda$ is large and $\theta$ is an odd multiple of 90°).

As can now be seen, the addition of the above described Faraday cell to the basic dye laser provides a frequency selective lasing system that can be varied as to frequency of transmission by varying the magnetic field. When the cell is inserted into the laser cavity and the magnetic field is adjusted so that little rotation occurs for those wavelengths not near an absorption peak, high internal loss (low gain) occurs because the polarizers are crossed, and lasing will not occur. However, for those components of frequency near an absorbtion peak, the $K_\lambda$ will rise dramatically and an adjustment of the magnetic field will cause $\theta$ to go to some odd multiple of 90° where high transmission will initiate lasing for particular wavelengths. The system thus acts as a tuned optical filter whose gross properties are determined by cell length and the particular Faraday medium and whose fine tuning properties are determined by the magnetic field strength. The result is that a lasing system having a random output frequency can be created by varying the magnetic field in a random manner from pulse to pulse. In addition, since the Faraday cell that is controlling laser frequency output is also extended to intercept the path of the received reflected beam, the cell will also act to isolate the received frequency so that the detector will only receive that frequency which is transmitted. The receiving portion will therefore act to automatically follow the frequency transmission of the transmitting portion. Pulse to pulse frequency stability is therefore not required since the receiver only has to be frequency stable during the relatively short time (microseconds) that the emitted radiation takes to travel to the target and back. This is particularly beneficial in an electronic countermeasure or high noise environment where random frequency changes would reduce the susceptibility of the optical radar to optical interference or jamming.

Of particular importance to the inventive system is the choice of the Faraday medium. The medium chosen should be one that has several close but not particularly strong absorption lines (e.g. the structure of a molecule such as iodine) in order to allow a greater degree of spectral tuning. The use of a multiline gas having a discontinuous frequency jump from one spectral region to another would also increase significantly the frequency selectivity over that obtained where only a single or few strong absorption lines are present.

The importance of the use of a dye laser having a broad spectral band now also becomes evident. By using a dye medium allowing emission over a broad spectral band, the laser can be controlled to emit at the randomly selected wavelengths under the control of the Faraday cell rather than at isolated wavelengths controlled by the lasing medium.

As can be seen from the above discussion and in following with the stated objects, the present invention provides a transceiver or optical radar system that generates frequencies with high selectivity by controlling laser emission with a Faraday cell over a spectral range. The Faraday cell is additionally extended into the path of the return beam to allow automatic tracking of the transmitted signal. By utilizing an optical switch and spectral filters in conjunction with the Faraday cell, unwanted and interfering radiation is prevented from reaching the system detector. Additionally, by operation of the magnetic field control in a random manner, the frequency of transmission on a pulse to pulse basis can be selected to reduce the vulnerability of an optical radar to interfering radiation.

While the invention has been described with reference to particular elements, it is noted that many modifications are readily apparent. For example, in the laser cavity it is often desirable to use a dispersive element to provide a course grained frequency selectivity. Typically this can be accomplished by utilizing a grating as one of the end mirrors to provide a slow coarse grained tuning in conjunction with the fast fine tuning of the magnetically controlled Faraday cell.

Obviously many further modifications and variations are possible in light of the above teachings. It is therefore to be understood that within the scope of the appended claims the invention may be practiced otherwise than as specifically described.

What is claimed and desired to be secured by Letters Patent of the United States is:

1. In an optical radar system having a transmitting portion for generating an optical radar beam, an optical system directing said beam to a target and collecting the reflected radiation, and a receiving portion having a detector for sensing the reflected radiation, the improvement in said system comprising:

a laser transmitter forming said transmitting portion and comprising, a first partially transmissive end reflector and a second substantially totally reflective end reflector positioned to form a laser cavity, a dye cell positioned in said cavity and aligned between said end reflectors, and means for stimulating said dye cell to laser emission to generate said optical radar beam;

a single Faraday cell comprising, two polarizers crossed by 90° and separated by a Faraday medium, said Faraday cell having a first portion extending into the laser cavity such that the laser beam must pass through the Faraday cell, and a second portion extending into an optical path between said optical system and said detector such that the reflected beam must pass through the Faraday cell before sensing by the detector;

means for establishing a magnetic field surrounding said Faraday cell and randomly varying the magnetic field strength so as to vary the optical frequency passed by said cell;

an optical switch and a plurality of spectral filters positioned in the optical path between said second portion of said Faraday cell and said detector; and means coupled to said stimulating means and said optical switch for controlling said switch in conjunction with said laser transmitter to block optical radiation to said detector during lasing and pass optical radiation only during viewing of the reflected beam.

2. The system of claim 1 wherein said substantially totally reflective end reflector is a grating.

3. A method of protecting an optical radar system from unwanted or interfering radiation at a radar detector comprising:

forming a dye laser having a first partially transmissive end reflector, a second grating end reflector, and a dye cell aligned therebetween to form a cavity;

generating a pulsed laser radar beam by stimulating said dye cell to laser emission;

inserting a Faraday cell having a first portion extending into the laser cavity to control the frequency of the laser beam;

randomly varying the frequency passed by the Faraday cell;

transmitting the beam to a target;

receiving the reflected beam from the target through a second portion of the same Faraday cell;

positioning a radar detector to detect the beam passed by the Faraday cell;

inserting an optical switch into the beam path between the second portion of the Faraday cell and the detector; and controlling said switch to block optical radiation to the detector during generation of the beam and to pass optical radiation only during viewing of the reflected beam.

* * * * *